United States Patent Office 3,012,646
Patented Dec. 12, 1961

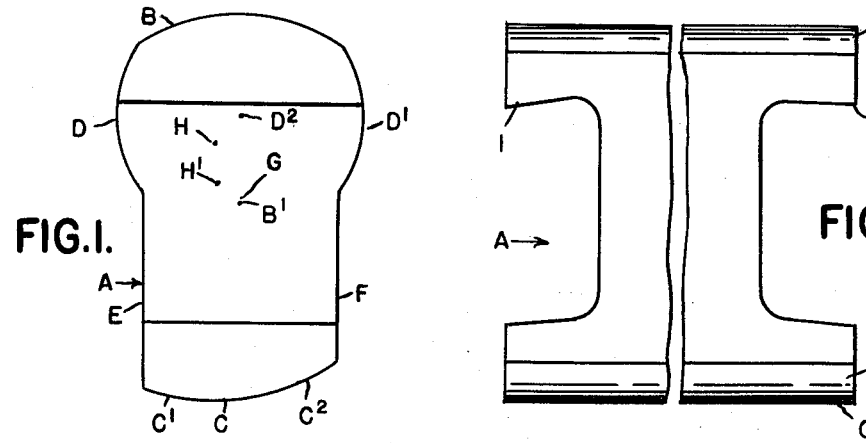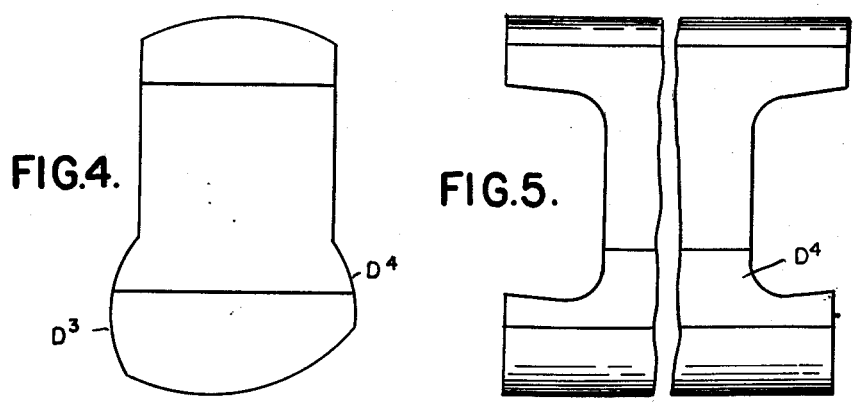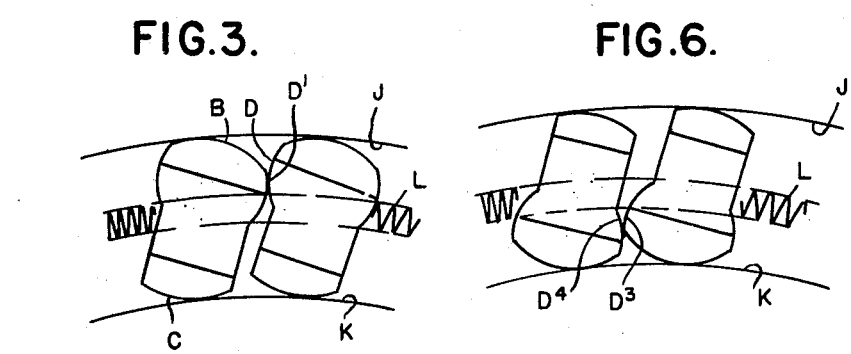

3,012,646
SPRAG FOR ONE-WAY CLUTCHES
Thaddeus F. Zlotek, Detroit, Mich., assignor to Formsprag Company, Warren, Mich., a corporation of Michigan
Filed June 9, 1958, Ser. No. 740,878
5 Claims. (Cl. 192—45.1)

The invention relates to one-way clutches, including sprags of the so-called barrel type. These have on opposite sides thereof diametrically opposite segments of a circle for contacting with adjacent sprags and maintaining substantially uniform spacing within maximum limits of tilting or individual angular movement.

It is the object of the invention to improve the performance of such sprags in the operation of the clutch and more particularly to lessen friction and wear when a race is overrunning. To this end it is one of the features of my invention shift the location of said segments from their usual position centered midway between the races into closer proximity to one race. Other advantageous features will be more fully hereinafter described.

This application constitutes a continuation-in-part of my application Serial No. 691,609, which is now abandoned.

In the accompanying drawings:

FIG. 1 is an end elevation and FIG. 2 is a side elevation of a sprag of my improved construction.

FIG. 3 is a portion of a one-way clutch showing a pair of sprags in relation to each other and to the races and energizing means.

FIGS. 4 and 5 are views, respectively similar to FIGS. 1 and 2, showing a modified construction.

FIG. 6 is a view similar to FIG. 3 but with the modified construction of sprag.

As illustrated, more particularly in FIGS. 1 and 2, the sprags may be formed from an extruded bar A having eccentric arcuate race engaging cam surfaces B and C of mild and generally similar degree of curvature for tangential wedging engagement with annular race surfaces, and concentric arcuate side faces D and D'. The center $D^2$ of the latter is located nearer the surface B than to surface C so that the arcs of surfaces D and D' intersect the arc of surface B. The remainder of the sprag is of lesser width and as shown is formed by parallel sides E and F. For a purpose later to be described the center B' of the arcuate face B is located very close to the center of gravity G of the cross section of the bar. The face C may be formed of two tangent curves C' and $C^2$, respectively centered at H and H'. Inasmuch as it is primarily at the curve portion $C^2$ that the wedging face or surface C has sliding engagement with the inner race K during overrunning the last named surface may be considered as being in effect centered at H', the center of curve $C^2$, in this phase. The average dimension between the baces B and C is such that in relation to the radial space between the races of the clutch for which the sprag is designed (FIG. 3), it will be at an angle to the radius of the races, or in other words, both B and C will be cam faces. The sprag is a severed length of the bar A and has formed at its opposite ends the notches I and I' for receiving energizing springs which are retained by under-cutting the faces of the notches against which they are respectively pressed.

As shown in FIG. 3 the arcuate faces D and D' of adjacent sprags are in contact with each other. J is the outer race, K the inner race and L the annular energizing spring, which latter bears against a point in the outer surface of the notch I to bias the sprag to turn in a counterclockwise direction into engagement with the race J. Thus if the race J is the driving member it will automatically clutch when turning counterclockwise relative to the sprags and will be released by a relative rotation in the opposite direction. This may occur either by a reversal in direction of rotation of the race J or by a decrease in speed in the same direction so that the race K will continue its rotation by the inertia of the driven parts. In the latter case there will be friction between the overrunning race K and sprags due to the pressure of the energizing spring and also friction between the contacting surfaces D and D' of adjacent sprags which move in opposite directions.

It will be apparent from the above that the contact point between surfaces D and D' of adjacent sprags become fulcrums of levers, the arms of which extend oppositely to the contact points respectively with the races J and K. If the surfaces D and D' are centered midway between the races, these lever arms will be of equal length. On the other hand, if, as shown in FIGS. 1 and 3, the centers of these surfaces are shifted outward, there will be a short lever arm extending to the outer race J and a longer arm to the inner race K. Consequently the pressure of each sprag against the inner race will be lessened with the reduction in friction and wear. There will also be diminished resistance by the oppositely moving contacting surfaces D and D' of adjacent sprags due to this longer lever arm to the race K. This will produce a softer action both in clutching and declutching which is advantageous, particularly where reversals are frequent.

As above stated the center of the arcuate outer face is located near the center of gravity of the sprag so that centrifugal action will have but slight effect in turning the sprag. As it is impossible to exactly locate the center of the arc on the center of gravity they are slightly spaced in a direction which biases the sprag towards clutch engagement by centrifugal action. However, this spacing is very small, being only a few thousandths of an inch so that the effect is very slight. By contrast, the center of the component curve $C^2$ of wedging face or surface C, which has sliding engagement with the inner race during overrunning, is at the point H', i.e., substantially further radially spaced from the center of gravity G than the center B' of the outer wedging surface B.

Thus, with the distance between the wedging surface centers B' and H' substantially greater than that between the center B' and the center of gravity G, it follows that, for equal torque exerted on the sprag as the clutch overruns, a lesser force is exerted at the lever arm or moment arm B', H' than at the centrifugal force arm B', G, i.e., a lesser force urges wedging surface C against inner clutch race K. This minimizes wear in overrunning, in addition to the effect of fulcrumming or "hinging" the sprags, one upon the other, at a point remote from the point of sliding engagement.

For certain uses of one-way clutches it may be advantageous to locate the concentric arcuate side surfaces $D^3$ and $D^4$ adjacent to the inner race. This is shown in FIGS. 4 to 6, inclusive, the construction being otherwise the same as in FIG. 1.

While I have thus far described contact of adjacent sprags with each other, it is obvious that such contact might be made between the arcuate side faces and some other member, such as a retainer. In each case there would be an advantage in locating the center of said concentric arcuate faces nearer one cam face than the other to obtain the unequal length of lever arms.

What I claim as my invention is:

1. A one-way clutch comprising a pair of radially spaced, concentric first and second races, and a circumferentially extending series of sprags disposed between said races in fulcrumming engagement with one another, said sprags each having a center of gravity, a pair of opposite, parallel sides extending in a generally radial direction and spaced from one another in the circumferential direction of said series, and first and second, diametrically opposed rounded wedging surfaces extending respectively between corresponding opposite radial extremities of said sides for releasable wedging engagement respectively of said first surface with said first race and said second surface with the second race, said wedging surfaces having different predetermined centers on the sprag, said sprags each having a rounded fulcrum surface on each of the respective radially extending sides thereof, which fulcrum surfaces face in opposite directions circumferentially of said sprag series and are each oppositely convex about a center spaced substantially from the center of gravity of the sprag toward the first wedging surface, thus to locate said fulcrum surfaces relatively closely adjacent said first wedging surface, successive sprags of the series having fulcrumming engagement with one another at adjacent respective fulcrum surfaces thereof, said radially extending sides of the sprag intersecting the second wedging surface thereof at another radial portion of the sprag which is of substantially less width in the circumferential direction of the series than between said fulcrum surfaces, and the sprags of the series being substantially spaced circumferentially from one another at the respective last named portions thereof, said first wedging surface being centered substantially more closely to said center of gravity than said second wedging surface.

2. A clutch in accordance with claim 1, in which said sprag has a greater length of lever arm from its point of fulcrumming engagement with a succeeding sprag to its point of wedging engagement with said second race than from said fulcrumming point to its point of wedging engagement with the first race.

3. A clutch in accordance with claim 1, in which said first wedging surface of the sprag is a radially outer surface thereof engaging an outer clutch race, said fulcrumming surfaces outwardly intersecting said outer wedging surface.

4. A clutch in accordance with claim 1 in which said first wedging surface of the sprag is a radially inner surface thereof engaging an inner clutch race, said fulcrumming surfaces inwardly intersecting said inner wedging surface.

5. A clutch in accordance with claim 1, in which said fulcrumming surfaces are defined by arcs of a common circle centered substantially radially from the center of gravity of the sprag in the direction toward said first wedging surface.

References Cited in the file of this patent

UNITED STATES PATENTS

| | | |
|---|---|---|
| 1,694,377 | De Lavaud | Dec. 11, 1928 |
| 2,240,359 | Weigel | Apr. 29, 1941 |
| 2,385,799 | Dodge | Oct. 2, 1945 |
| 2,486,262 | Davis | Oct. 25, 1949 |
| 2,881,886 | Troendly et al. | Apr. 14, 1959 |